United States Patent [19]
Dickinson et al.

[11] Patent Number: 5,791,971
[45] Date of Patent: Aug. 11, 1998

[54] GLASS CUTTING MACHINE WITH LINEAR MOTOR

[75] Inventors: William H. Dickinson, Zelienople; Hugh M. Trautmann, Renfrew, both of Pa.

[73] Assignee: Billco Manufacturing, Inc., Zelienople, Pa.

[21] Appl. No.: 720,021

[22] Filed: Sep. 27, 1996

[51] Int. Cl.⁶ .................. B24B 51/00; B26D 5/00
[52] U.S. Cl. .................. 451/11; 451/14; 451/41; 83/880; 83/318; 83/419; 83/467.1
[58] Field of Search .................. 451/5, 11, 14, 451/24, 41, 81, 150; 83/485, 487, 318, 419, 467.1, 880, 879, 871

[56] References Cited

U.S. PATENT DOCUMENTS

| | | | |
|---|---|---|---|
| 3,613,974 | 10/1971 | Chatelain et al. | 83/879 |
| 3,756,104 | 9/1973 | Bier et al. | 83/8 |
| 3,760,997 | 9/1973 | Bier | 225/2 |
| 3,797,339 | 3/1974 | Pape et al. | 83/12 |
| 3,880,028 | 4/1975 | Frederick, Jr. | 83/880 |
| 4,012,974 | 3/1977 | Reinmold | 83/6 |
| 4,286,197 | 8/1981 | Eberhard et al. | 318/135 |
| 4,834,353 | 5/1989 | Chitayat | 269/3 |
| 4,875,461 | 10/1989 | Schara et al. | 83/879 |
| 4,920,495 | 4/1990 | Pilkington | 83/880 |
| 5,079,876 | 1/1992 | Zumstein | 451/11 |
| 5,265,986 | 11/1993 | Prokopp | 408/3 |
| 5,367,770 | 11/1994 | McCaughey | 83/879 |
| 5,389,579 | 2/1995 | Bando | 83/879 |
| 5,472,367 | 12/1995 | Slocum et al. | 451/14 |

*Primary Examiner*—Maurina I. Rachuba
*Attorney, Agent, or Firm*—Webb Ziesenheim Bruening Logsdon Orkin & Hanson, P.C.

[57] ABSTRACT

A table for cutting, grinding or otherwise machining a frangible workpiece includes a conveyor for receiving, supporting and selectively moving the workpiece on the table and a carriage mounted for moving both parallel to the centerline of the table and perpendicular to the centerline of the table. A machine tool for machining the workpiece, such as a cutting head or grinding head, is mounted on the carriage above the conveyor. A first linear motor mechanism is mounted below the conveyor in an area protected from the machining environment for moving the carriage parallel to the centerline of the table. A second linear motor mechanism moves the carriage perpendicular to the centerline.

20 Claims, 3 Drawing Sheets

GLASS CUTTING MACHINE WITH LINEAR MOTOR

BACKGROUND OF THE INVENTION

1. Field of the Invention

The present invention relates to tables for machining workpieces and, more specifically, the present invention relates to glass cutting machines using linear motors.

2. Background Information

Generally, glass cutting tables of the existing prior art utilize a workpiece support or table with a carriage mounted for movement in an X-Y plane above the table. A cutting head or grinder is mounted on the carriage for cutting or otherwise machining the glass workpiece. Historically, mechanical mechanisms were utilized for moving the carriage such as ball screws or lead screws. In addition to taking up a large amount of space, these prior art mechanical designs do not provide a fast-acting response with accurate positioning.

The prior art has developed several different cutting heads in attempting to address these problems. For example, U.S. Pat. Nos. 3,756,104 and 3,760,997 both disclose a cutting head in a glass cutting machine which is actuated using a constant-reluctance motor. U.S. Pat. Nos. 3,797,339 and 4,012,974 disclose carriages for glass cutting machines in which the cutting tool is moved by a linear induction motor. However, these prior art glass cutting machines fail to provide effective, economical movement of the cutting head in both the X and Y directions.

Linear motor technology has been utilized for various positioning applications and provides high speed, high acceleration and smoothness of motion with a short settling time. Linear servomotors have been available since the early 1980's and have been used in systems such as X-Y graphic plotting devices and inspection applications for circuit boards and the like. Typical linear motors can be supplied by Anorad Corporation. Linear servomotors work essentially the same as rotary motors, but are opened up and laid out flat. In general, each motor is made up of two parts, a set of electrical coils embedded within a coil core and a set of magnets mounted on a steel magnet plate to generate a high magnetic flux. The linear motors require little maintenance in view of the lack of moving parts. However, they do require that the motor be kept clean. This limitation results in linear motors being effectively useful in clean room environments. However, existing X-Y positioning systems or gantry positioning systems would not operate well in even light machining environments.

It is an object of the present invention to design a glass cutting machine utilizing a linear motor which overcomes the aforementioned problems of the prior art. A further object of the present invention is to provide a glass cutting machine with linear motor drive which is cost-effective to manufacture and use and minimizes the maintenance required.

SUMMARY OF THE INVENTION

The above-described objects are achieved by providing a table for cutting a frangible workpiece according to the present invention. The table includes a table surface for supporting the frangible workpiece and a carriage mounted for moving both parallel to a centerline of the table and perpendicular to the table centerline. A cutting head for cutting the frangible workpiece is mounted on the carriage above the conveyor. A motor mechanism for moving the carriage perpendicular to the centerline of the table is provided. A linear motor mechanism is mounted below the conveyor for moving the carriage parallel to the centerline of the table.

In one embodiment of the present invention, a conveyor which is supported on a frame forms the table surface with the conveyor receiving, supporting and selectively moving the workpiece along the table. A carriage support extends substantially around an upper surface of the conveyor and is mounted for movement relative to the frame moving in a direction substantially parallel to the table centerline. The carriage is movably mounted on the carriage support for movement in a direction substantially perpendicular to the table centerline. The linear motor mechanism includes a downwardly facing magnetic track extending substantially along the centerline of the table at a position directly underneath the conveyor. The linear motor mechanism also includes a linear motor positioned on said carriage support adjacent the track. The present invention additionally incorporates linear bearings and supports on the frame on opposite sides of the downwardly facing track to support the carriage support and carriage and to further protect the linear motor mechanism. The mechanism for moving the carriage perpendicular to the centerline of the table may be formed as a second linear motor mechanism with a second magnetic track mounted on the carriage support extending substantially perpendicular to the table centerline and a second linear motor adjacent the second track on the carriage support.

These and other advantages of the present invention will be clarified in the description of the preferred embodiment taken together with the attached figures wherein like reference numerals represent like elements throughout.

BRIEF DESCRIPTION OF THE PREFERRED EMBODIMENT

Figure 1:
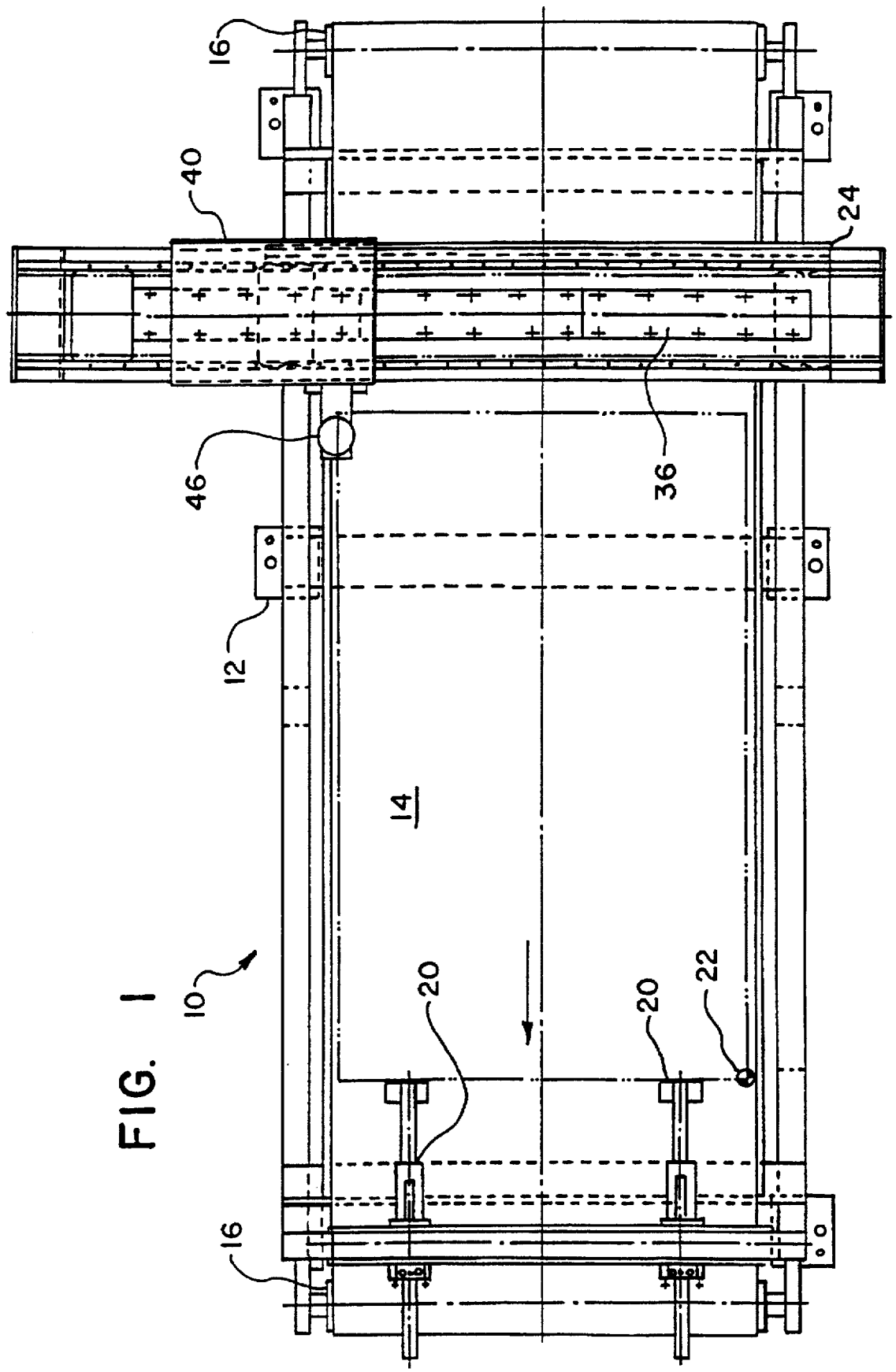
FIG. 1 illustrates a plan view of a glass cutting table according to the present invention.
Figure 2:
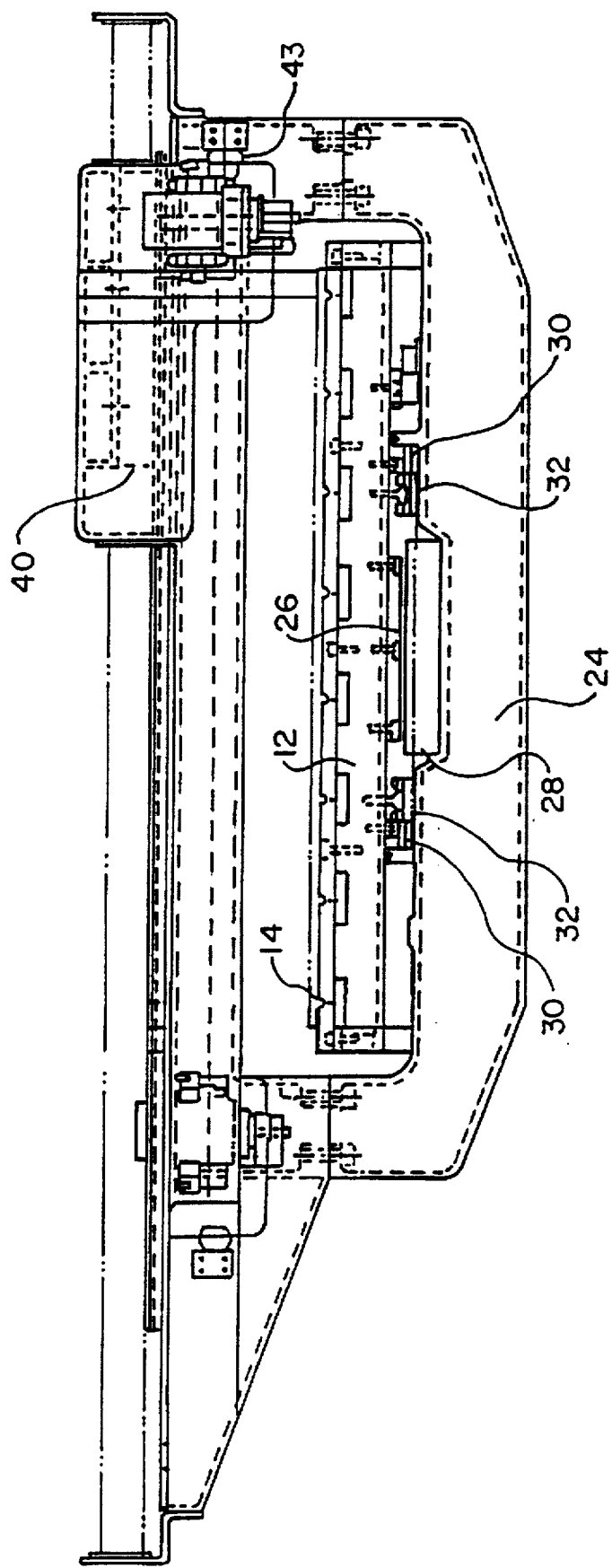
FIG. 2 is a cross section across the table of the glass cutting table illustrated in FIG. 1.
Figure 3:
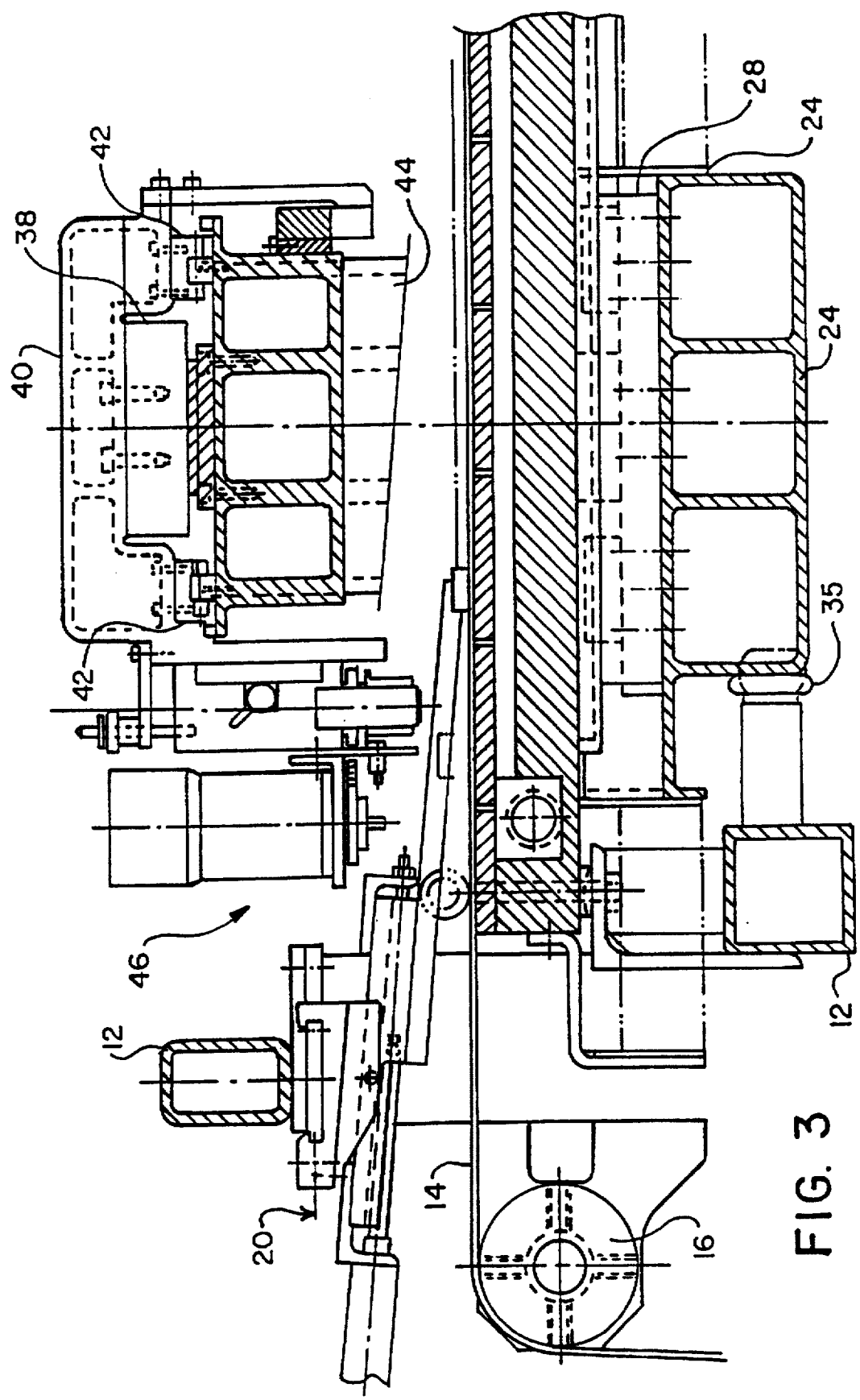
FIG. 3 is an enlarged section view of the carriage structure of the glass cutting table illustrated in FIG. 1.

FIGS. 1–3 illustrate a glass cutting table 10 according to the present invention. The table 10 includes a frame 12 supporting the table 10. A conveyor 14 is wrapped around pulleys 16 which are rotatably attached to the frame 12. The conveyor 14 is driven by a conventional motor drive (not shown) and is adapted to receive, support and selectively transport a glass workpiece substantially along the centerline 18 of the table 10. The conveyor 14 forms the table surface for the cutting table 10. As shown in FIGS. 2–3, the frame 12 may include a planar support beneath the conveyor 14 to help form the tabletop structure.

A pair of movable, retractable front stops 20 is attached to the frame 12 above the conveyor 14 and is adapted to engage and align a rectangular glass workpiece with a zero reference 22 for proper workpiece orientation on the table 10 prior to cutting.

A carriage support 24 is movably supported on the frame 12. The carriage support 24 extends substantially around an upper portion of the conveyor 14 as shown in FIG. 2. The carriage support 24 is mounted for movement substantially along the centerline 18 of the table 10. A magnetic track 26 is mounted to the frame 12 under the conveyor 14 substantially along the centerline 18 of the table 10 facing downwardly away from the upper surface of the conveyor 14. A linear motor 28 is mounted to the carriage support 24 adjacent the track 26. The linear motor 28 and track 26 form the mechanism for moving the carriage support 24 along the centerline 18. Supports 30 and linear bearings 32 are on either side of the linear motor 28 and track 26 for movably supporting the carriage support 24 from the frame 12. The position of the track 26 and linear motor 28 beneath the conveyor 14; the downward orientation of the track 26; and the relative encapsulating position of the carriage support 24, supports 30 and linear bearings 32 all help to isolate and protect the carriage support moving mechanism from the cutting environment.

A linear encoder 34 is provided on the carriage support 24 for feedback control of the linear motor 28. Bumper stops 35 (shown in FIG. 3) will be provided on the frame 12 at either end of the table 10 to limit movement of the carriage support 24 along the centerline 18 of the table 10.

A second magnetic track 36 is mounted on the carriage support 24 extending substantially perpendicular to the centerline 18 of the table 10. A linear motor 38 is mounted in a movable carriage 40 at a position adjacent the track 36. The carriage 40 is movably mounted on the carriage support 24 by linear bearings 42 on opposite sides of the track 36 and linear motor 38. The track 36 and linear motor 38 provide the mechanism for moving the carriage 40 perpendicular to the centerline 18 of the table 10. An encoder 44 is mounted on the carriage 40 for feedback control of linear motor 38. Bumper stops 43 are attached to the carriage support 24 to limit the movement of the carriage 40 along track 36. The carriage 40 is movable parallel with the centerline 18 by movement of the carriage support 24 by linear motor 28 and track 26.

A conventional cutting head assembly 46 is attached to the carriage 40 for cutting or scoring of the glass workpiece. A typical cutting head assembly will include a rotatable cutting wheel mounted on a vertical slide arrangement adapted to engage and cut the glass workpiece with sufficient cutting force or pressure.

The track 36 and linear motor 38 are positioned well above the cutting or working surface on the upper surface of the conveyor 14 and, therefore, are in less need of protection. However, a protective bellows or accordion-type sleeve (not shown) will preferably extend in both directions from the carriage 40 over the track 36. A similar protective cover (not shown) may be used around track 26 extending from both directions from the carriage support 24. However, as discussed above, the positioning of the track 26 and linear motor 28 is intended to minimize this need.

The present invention effectively adapts linear motors for positioning of a tool in a machining environment. The present design provides a fast-response, highly accurate positioning system for glass cutters and the like. The present invention provides a simple, effective positioning system which also minimizes space of the overall table 10. Although the present invention is disclosed with glass cutting machines, it is applicable to other types of machining such as grinding, milling or the like.

It will be apparent to those of ordinary skill in the art that various modifications may be made without departing from the spirit and scope of the present invention. The scope of the present invention should be defined by the appended claims and equivalents thereof.

What is claimed is:

1. A table for machining a workpiece comprising:
    a conveyor for receiving, supporting and selectively moving the workpiece on said table;
    a carriage mounted for movement both parallel to a centerline of said table and perpendicular to said centerline of said table;
    a machine tool for machining the workpiece, said machine tool mounted on said carriage above said conveyor;
    a first linear motor mechanism mounted below said conveyor for moving said carriage parallel to said centerline of said table; and
    a second linear motor mechanism for moving said carriage perpendicular to said centerline.

2. The table as claimed in claim 1 wherein said first linear motor mechanism includes a downwardly facing track extending substantially parallel to said centerline of said table, and a linear motor adjacent said track.

3. The table as claimed in claim 2 wherein said downwardly facing track of said first linear motor is positioned substantially along said centerline of said table beneath said conveyor.

4. The table as claimed in claim 3 further including a frame supporting said conveyor and said carriage.

5. The table as claimed in claim 4 further including a carriage support extending substantially around an upper surface of said conveyor, wherein said linear motor of said first linear motor mechanism is mounted on said carriage support and said carriage is movably mounted on said carriage support to provide said movement perpendicular to said centerline of said table.

6. The table as claimed in claim 5 further including linear bearings and support mechanisms attached to said frame on opposite sides of said track of said first linear motor mechanism for supporting said carriage support.

7. The table as claimed in claim 6 wherein said second linear motor mechanism includes a track mounted on said carriage support extending substantially perpendicular to said centerline of said table and a linear motor mounted on said carriage adjacent said track.

8. The table as claimed in claim 7 further including at least one retractable stop mounted on said frame above a top surface of said conveyor stopping the advance of said workpiece along said conveyor.

9. The table as claimed in claim 8 wherein said machine tool is a cutting head assembly for cutting a frangible workpiece.

10. A table for cutting a frangible workpiece, said table comprising:
    a table surface for supporting said frangible workpiece;
    a carriage mounted for movement both parallel to a centerline of said table and perpendicular to said centerline of said table;
    a cutting head assembly for cutting said frangible workpiece, said cutting head assembly mounted on said carriage above said table surface;
    a means for moving said carriage perpendicular to said table centerline; and
    a linear motor mechanism mounted below said table surface for moving said carriage parallel to said centerline of said table.

11. The table as claimed in claim 10 wherein said linear motor mechanism includes a downwardly facing track mounted below said table surface and a linear motor positioned adjacent said track.

12. The table as claimed in claim 11 wherein said track is mounted along a centerline of said table surface.

13. The table as claimed in claim 10 further including a conveyor forming said table surface, said conveyor adapted to receive and selectively move the frangible workpiece along said table.

14. The table as claimed in claim 13 further including at least one movable, retractable workpiece stop mounted above said conveyor, said stop adapted to engage and stop the advancement of the workpiece along said table.

15. The table as claimed in claim 10 further including a carriage support extending substantially around said table surface, wherein said carriage is movably mounted on said carriage support to provide for said movement perpendicular to said centerline of said table.

16. The table as claimed in claim 15 wherein said means for moving said carriage perpendicular to said centerline of said table includes a second linear motor mechanism.

17. The table as claimed in claim 16 wherein said second linear motor mechanism includes a track mounted on said carriage support substantially perpendicular to said centerline of said table and a linear motor mounted adjacent said track on said carriage.

18. A glass cutting table for cutting a glass workpiece, said glass cutting table comprising:

a frame;

a conveyor mounted on said frame for receiving, supporting and selectively moving the glass workpiece along said table in a direction substantially parallel to a centerline of said table;

a carriage support extending substantially around an upper surface of said conveyor, said carriage support movably mounted on said frame for movement in a direction substantially parallel to said centerline of said table;

a carriage movably mounted on said carriage support for movement in a direction substantially perpendicular to said centerline of said table, wherein said carriage and said carriage support allow said carriage to move both parallel to said centerline of said table and perpendicular to said centerline of said table;

a cutting head mounted on said carriage for cutting said glass workpiece supported on said conveyor;

a first linear motor mechanism for moving said carriage support and said carriage parallel to said centerline of said table, said first linear motor mechanism including a magnetic track mounted below said conveyor in a position underneath said conveyor and extending substantially along said centerline of said table and a linear motor mounted on said carriage adjacent said track; and a second linear motor mechanism for moving said carriage perpendicular to said centerline, said second linear motor mechanism including a track mounted on said carriage support extending substantially perpendicular to said centerline of said table and a linear motor mounted on said carriage adjacent said track.

19. The glass cutting table as claimed in claim 18 wherein said track of said first linear motor mechanism is downwardly facing.

20. The glass cutting table as claimed in claim 19 wherein said frame includes linear bearings and supports on opposite sides of said track of said first linear motor mechanism, said linear bearings and supports supporting said carriage support.

* * * * *